Dec. 5, 1944.   W. R. PETERSON   2,364,387
PRODUCTION OF POLYMER
Filed July 23, 1941
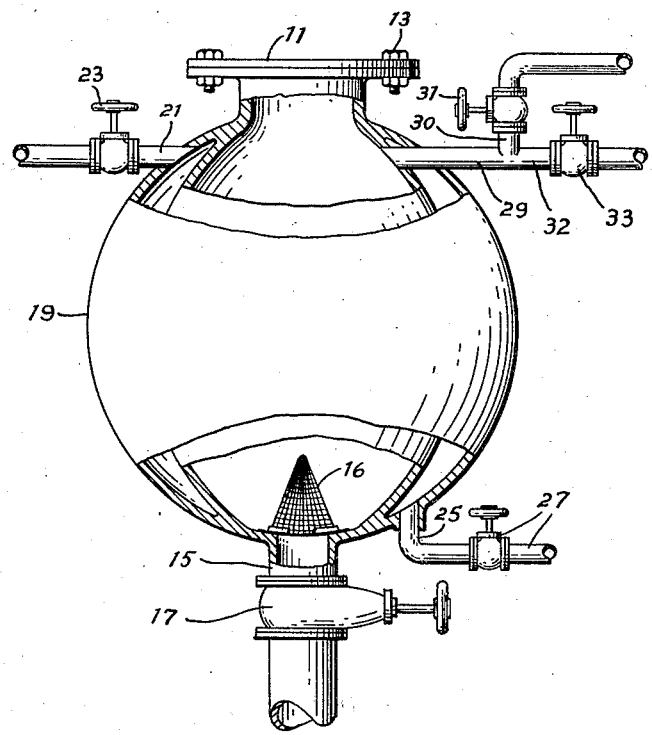
INVENTOR.
Wesley R. Peterson
BY
ATTORNEY Patented Dec. 5, 1944

2,364,387

UNITED STATES PATENT OFFICE 2,364,387

PRODUCTION OF POLYMER

Wesley Rasmus Peterson, Wilmington, Del., assignor to E. I. du Pont de Nemours & Company, Wilmington, Del., a corporation of Delaware Application July 23, 1941, Serial No. 403,598

5 Claims. (Cl. 260—78)

This invention relates to the recovery of synthetic linear polymers, and more particularly, it relates to the depolymerization of synthetic linear polymers by heating the same under pressure in the presence of a degrading liquid.

This is a continuation-in-part of my copending application Serial No. 350,021, filed August 2, 1940.

The term, "synthetic linear polymer," as used throughout the specification and claims is of restricted scope and is limited to the polymers described in Carothers United States Patents Nos. 2,071,250, 2,071,251, 2,071,253 and 2,130,948, and which may be obtained, for example, by condensation polymerization reactions as described in the patents. These synthetic linear polymers include polyamides, polyesters, polyethers (including polyacetals), polyanhydrides as well as mixed polymers such as polyester-polyamides. Of these polymers, the most interesting and useful are the synthetic linear polyamides, more particularly described in the last two above-mentioned patents. For convenience and simplicity, the invention will be described mainly in terms of these synthetic linear polyamides. However, it is to be clearly understood that the invention is not limited to polyamides, but is also applicable to other synthetic linear polymers, both of the fiber-forming and non-fiber-forming types; for example, synthetic linear polyesters, interpolymers, such as polyester-polyamides, as well as other synthetic linear condensation polymers.

The fiber-forming synthetic linear polyamides which will be used to illustrate the invention are high molecular weight products which are capable of being cold-drawn into fibers showing, by characteristic X-ray patterns, molecular orientation along the fiber axis. These polyamides, as defined above, or as otherwise identified hereinafter, can be obtained by self-polymerization of monoaminomonocarboxylic acids, or by reacting a diamine with a dibasic carboxylic acid in substantially equal molecular amounts, it being understood that reference herein to aminocarboxylic acids and dibasic carboxylic acids is intended to include the equivalent amide-forming derivatives of the amino acids and of dibasic carboxylic acids. In the case of the amino acids, these derivatives include substances such as caprolactam and, in the case of the dibasic carboxylic acids, substances such as adiponitrile. It is also to be understood that reference herein to diamines is intended to include amide-forming derivatives of the diamines, e. g., the N-formyl derivatives and the carbamates. Generally speaking, these synthetic linear polyamides comprise the reaction product of a polyamide-forming composition in which the molecules are bifunctional and contain two amide-forming groups, each of which is complementary to an amide-forming group in other molecules in said composition.

These linear polyamides include also polymers obtained by admixture of other linear polymer-forming reactants, as for instance, glycol-dibasic acid mixtures in the case of polyester amides, with the mentioned polyamide-forming reactants. In either instance, the amide group is an integral part of the main chain of atoms in which, in the case of the preferred fiber-forming polyamides, the average number of carbon atoms separating the amide groups is at least two.

While the properties of the synthetic linear polyamides will, of course, vary somewhat with the extent to which they have been polymerized and with the nature of the reactant used in their preparation, common characteristics of filaments derived from these polyamides are their high tenacity, both wet and dry; high degree of orientation; extraordinary resistance to solvents and chemical reagents; exceptionally good elastic recovery; good dyeing properties; and good aging characteristics in air even at elevated temperatures. For the best fiber-forming properties, the polymerization reaction should be continued until the intrinsic viscosity, as defined in United States Patent No. 2,130,948, is at least 0.4. These polymers are generally crystalline and can be formed, not only into filaments, but also into other useful articles, such as ribbons, foils, films, sheets, and the like, which formed structures may also be oriented to a high degree by cold-drawing, cold-rolling or other like treatments.

Synthetic linear polyamides have been used heretofore in the production of filaments, yarns, sheets, films, coating and adhesive compositions and other useful articles. The production of articles from synthetic linear polyamides involves the accumulation of considerable polyamide waste material. In view of the cost of preparing synthetic linear polyamides, it is particularly desirable to recover the synthetic linear polyamides from accumulated polyamide waste as well as from articles comprising the polyamides.

Although it might be expected that such waste material might be recovered by melting and reforming into the desired article from the melt, this is not practical on a large scale. The polyamides above their melting points are quite viscous and it is very difficult to obtain uniform blending of various scraps. Furthermore, it is practically impossible to remove all of the occluded and trapped oxygen from the scrap material. Consequently, the recovery of scrap by remelting would result in a very badly discolored product since the molten material is very readily attacked by oxygen with resulting discoloration. Also, because of the voluminous character of waste yarn (as well as other waste articles), it is very difficult to effect the transfer of heat to the yarn for the purpose of remelting it. This latter characteristic would result in other difficulties such as requiring the maintenance of a larger quantity of the material in the molten state (thus causing more rapid decomposition of the material and variations in physical and chemical properties attendant thereon) and the necessity for larger equipment or more frequent charging of the equipment.

It is, therefore, an object of this invention to provide a method of recovering synthetic linear polymers, and particularly polyamides, from articles comprising them.

It is a further object of this invention to provide a method for obtaining fiber-forming synthetic linear polymers from scrap material comprising synthetic linear polymers.

It is a further object of this invention to provide a method for preparing new and different synthetic linear polymers from pre-formed synthetic linear polymers.

It is a further object of this invention to provide a method for preparing solutions of fiber-forming synthetic linear polymers from synthetic linear polymer structures, said solutions having an average molecular weight below that of the parent material.

It is a further object of the invention to provide a method whereby the properties of synthetic linear polymers may be modified for dyeing and other purposes.

It is a further object of the invention to treat synthetic linear polymer articles so that their properties are affected by partial hydrolysis.

Other objects of this invention will hereinafter become apparent.

The objects of this invention are accomplished in general by heating, under pressure, a synthetic linear polymer in the presence of a degrading liquid, for example water, until depolymerization of the polymer to a fluid mass occurs. The fluid may be used as such or the water may be removed and the residue polymerized until a polymer of the desired properties is obtained. The polymer to be depolymerized may be waste polyamide, or an article comprising a synthetic linear polymer.

The invention may be more easily understood by reference to the accompanying drawing when taken in connection with the following detailed description.

The accompanying drawing is a front elevational view of an autoclave construction, constructed of stainless steel or other suitable material, suitable for use in accordance with the present invention.

With reference to the autoclave construction shown in the drawing, reference numeral 11 designates a closure member for the top of the autoclave. The closure member 11 may be fastened tightly to the autoclave by means of bolts 13. A conduit 15 is connected to the bottom of the autoclave, the conduit being provided with a shut-off valve 17 for regulation of the flow of material from the autoclave. A conical screen may be positioned to surround the outlet at the bottom of the autoclave. The autoclave is provided with a heating jacket 19. An inlet conduit 21 for a heating medium is connected to the heating jacket 19. The conduit 21 is provided with a valve 23 for control of the heating medium passing to the heating jacket. An outlet conduit 25 is connected to the heating jacket for withdrawal of the heating medium. The outlet conduit 25 is provided with a control valve 27. A conduit 29 is connected to the interior of the autoclave. This conduit 29 is provided with branch conduits 30 and 32, which branch conduits are provided respectively with valves 31 and 33. Conduit 32 may be connected to means for the creation of a vacuum to withdraw any air from the autoclave, and the conduit 30 may be connected to a source of nitrogen, or other inert gas, which may be passed into the autoclave at any desired pressure.

The apparatus disclosed in the drawing is adapted to operate as follows: Bolts 13 are removed and the cover plate 11 swung to one side so that a certain amount of distilled water and a quantity of waste synthetic linear polyamide may be charged into the autoclave. The cover plate 11 is then placed in a closed position and bolts 13 inserted and tightened in place. The valve 33 is now opened and a source of vacuum connected with the interior of the autoclave. After the gases have been substantially evacuated from the autoclave, valve 33 is closed and valve 31 is opened permitting nitrogen gas to flow into the interior of the autoclave. If desired the autoclave may be alternately flushed with nitrogen and evacuated several times. Other inert gases, i. e., gases inert to the polymers, such as carbon dioxide, or hydrogen, may be used in place of nitrogen. Both valves 31 and 33 are then closed. An alternative method of purging may be used, if desired, using steam or some other suitable vapor or gas instead of nitrogen. Valve 23 in conduit 21 is then opened and a quantity of a heating medium such as steam or Dowtherm vapors permitted to flow into the heating jacket 19. Condensed heating medium may be withdrawn through conduit 25 and valve 27. After the heating jacket reaches the desired temperature, the quantity of heating medium flowing into the jacket is adjusted to maintain the desired temperature. After heating the distilled water and synthetic linear polyamide waste in the autoclave for the proper period of time to cause a depolymerization of the polyamide to the point where the depolymerized material is liquid, the molecular weight is found to be lower than that of the parent material. The solution may be extruded at this point to yield a finely divided product, subdivision being caused by the flashing off of the superheated water. Alternatively, the polymer may be repolymerized by opening the valve 33 while the autoclave is being heated, thus permitting a gradual bleeding of steam from the autoclave. The heating in the autoclave is continued until the depolymerized material has again been polymerized to form the synthetic linear polyamide of the desired intrinsic viscosity. During the step of polymerization the autoclave is heated to a temperature sufficiently high to obtain the polymerized synthetic linear polyamide in the molten state. The molten synthetic linear polyamide is then removed from the autoclave by opening valve 17 and forcing the polyamide to flow through the screen 16 and conduit 15. If desired, the conduit 15 may be provided with a round or slit-like orifice and thereby cause the polyamide to be extruded in the form of a rod or ribbon. If desired, the molten polyamide may even be extruded directly from the autoclave in the form of yarn or monofils or film. The molten synthetic linear polyamide may be pumped from the autoclave, or alternatively may be forced from the autoclave by pressure of nitrogen passed into the autoclave through valve 31 and conduits 30 and 29.

The following examples are given to illustrate certain specific embodiments of the present invention, it being understood that the invention is not to be limited thereto.

Example I

Three hundred and thirty-nine grams of waste polyhexamethylene adipamide yarn were washed with a 10% aqueous soap solution and rinsed thoroughly with water. This yarn was then charged together with 110 grams of water into an autoclave. The autoclave was alternately evacuated and flushed with $N_2$ several times to remove air and then closed at atmospheric pressure and heat was applied. In approximately two hours the temperature had reached 290° C. and the pressure 300 pounds per square inch. Water vapor was thereafter bled from the autoclave to prevent the pressure from increasing and the heating was then continued for twenty minutes after which the rate of bleeding was increased to lower the pressure 15 pounds per square inch per minute until all the water vapor had been removed. The autoclave was then put under 50 pounds per square inch nitrogen pressure and the heating continued. It was then evacuated to remove bubbles and finally cooled. The fiber-forming polyhexamethylene adipamide obtained had an intrinsic viscosity (as defined in Carothers U. S. Patent No. 2,130,948) of 0.83.

Example II

Twenty-five pounds of waste polyhexamethylene adipamide yarn was charged into an autoclave together with 22 pounds of water and the autoclave evacuated to remove air. Heat was then applied. After about an hour, the pressure had reached 25 pounds per square inch, thirty minutes later it had reached a pressure of 120 pounds per square inch, and thirty minutes later it had reached a pressure of 250 pounds per square inch. During the next two hours the heating was continued and the water vapor bled off at a sufficient rate to maintain the pressure at 250 pounds per square inch. At the end of this period the temperature was 270° C. The temperature was then held constant and the rate of bleeding increased so that at the end of an hour and a half the pressure had been reduced to atmospheric pressure. The molten polymer was then extruded in the form of a rough ribbon directly into cold water and cut into small chips or flakes. These flakes were then dried, blended with freshly made polymer, charged into a melt spinning apparatus where it was melted and spun in the form of a multifilament yarn.

Example III

Thirty pounds of off-color scrap, polyhexamethylene adipamide polymer was charged into an autoclave together with 15 pounds of water and 135 grams of a slurry of the salt produced by reaction of hexamethylene diamine and adipic acid, and carbon black (ratio 4 parts salt to 1 part carbon black), and 240 grams of lauric acid. The autoclave was then heated as described in Example II and the polymer produced was extruded, cut, etc. The chips were then used for the melt spinning of bristles.

Example IV

After thoroughly purging free from oxygen, three hundred grams of polyhexamethylene adipamide yarn are heated with six hundred grams of water at 210° C. in an autoclave for one hour. At the end of this time, the yarn has dissolved in the superheated water to form a homogeneous solution of polymer having a molecular weight much lower than that of the yarn (giving less viscous solutions). This solution is extruded into air, under which condition the water flashes off, yielding the polyamide in a finely divided form, useful for blending with pigments.

Example V

Five parts of waste polyhexamethylene adipamide yarn, 5 parts of hexamethylene diammonium sebacate (the salt prepared by reacting hexamethylene diamine and sebacic acid), and 10 parts of water are charged into an autoclave. The autoclave is purged free from air and the contents are heated to 250 pounds steam pressure. The polyhexyamethylene adipamide becomes partially depolymerized. Water vapor is then bled off at a rate to maintain the pressure at 250 pounds per square inch until the temperature reached 270° C. The pressure is then gradually reduced to atmospheric pressure while maintaining the temperature at 270° C. and the molten semi-interpolyamide product (a semi-interpolyamide of polyhexamethylene adipamide and polyhexamethylene sebacamide) is extruded and cut into flakes suitable for subsequent melt extrusion.

Example VI

Four parts of caprolactam, 6 parts of chopped up polyhexamethylene adipamide yarn, and 10 parts of distilled water are charged into an autoclave. The autoclave is purged free from air and the contents are heated to approximately 250° C. The polyhexamethylene adipamide yarn becomes partially depolymerized. The reaction mixture is then repolymerized as described in Example V except that at the end of the cycle the semi-interpolymer is evacuated for a period of two hours while holding at 275° C. The semi-interpolymer is extruded and cut into flakes suitable for subsequent melt extrusion or other processes for producing useful products, such as films, filaments, coatings, etc.

Example VII

One hundred twenty-four parts of ethylene glycol, 292 parts of adipic acid, 73 parts of polyhexamethylene adipamide, and 490 parts of distilled water are charged into an autoclave and heated to approximately 210° C. The polyhexamethylene adipamide becomes partially depolymerized. The ester-amide ingredients are then polymerized by heating for two hours at 150° C.—atmospheric pressure, eight hours at 200° C.—atmospheric pressure, five hours at 250° C.—20 mm. pressure, and eighteen hours at 250° C.—2 mm. pressure. A slow stream of nitrogen was bubbled through the mixture to cause agitation and facilitate removal of water. The resulting product was a tough, transparent elastic polymer.

Example VIII

Fifty parts of waste polyhexamethylene adipamide yarn, 50 parts of waste polyhexamethylene sebacamide yarn, and 100 parts of distilled water are charged into an autoclave. The autoclave is purged free from air. The contents are heated to approximately 210° C. The polyhexamethylene adipamide and polyhexamethylene sebacamide become partially depolymerized. Repolymerization is carried out as described in Example V. The semi-interpolymer of polyhexamethylene adipamide and polyhexamethylene sebacamide is extruded and cut into flakes suitable for subsequent melt extrusion or other methods of processing to produce filaments, films, coatings, etc.

Example IX

A sheet of polyhexamethylene adipamide film is wetted and treated with a hot roll in such a manner as to effect a localized partial hydrolysis of the polyamide. The film is then dyed, producing a novel dyed effect due to the partially hydrolyzed part.

Example X

One hundred twenty grams of polyhexamethylene sebacamide, 680 grams of polyhexamethylene adipamide, and 300 grams of water were heated in a stainless steel autoclave to 215° C. at a pressure of 250 pounds per square inch for one hour. The internal temperature was then increased to 265° C. during one and one-half hours, while maintaining the pressure at 250 pounds by bleeding steam from the autoclave. The pressure was finally reduced to atmospheric over a period of 30 minutes and the reactants were held at 285° C. and atmospheric pressure for 40 minutes. The resulting polymer had a quenching index of 25, quenching index being defined as the maximum thickness (in mils) of clear polymer that can be cast from a melt using water at 0° C. as the quenching medium.

The product of this example is a "semi-interpolymer," which term will be more particularly described and defined hereinafter. An interpolymer prepared from like proportions of the monomeric ingredients, namely, 15% of hexamethylene diammonium sebacate (the salt obtained by reaction of hexamethylene diamine with sebacic acid) and 85% of hexamethylene diammonium adipate (the salt obtained by reaction of hexamethylene diamine with adipic acid) is found to have a quenching index of 31.

Example XI

A mixture of 17 pounds of bright polyhexamethylene adipamide, 11.5 pounds of hexamethylene diammonium sebacate, and 11 pounds of distilled water was heated to 215° C. at a pressure of 250 pounds per square inch and held at this temperature for two hours in a stainless steel autoclave. After this holding period, the reaction temperature was raised to 270° C. and steam was bled from the autoclave at such a rate that the pressure was maintained at 250 pounds. The pressure was finally reduced to atmospheric, keeping the polymer temperature at 270° C. These conditions were maintained for one hour and the polymer was then extruded from the autoclave. The product was a semi-interpolymer which had a melt viscosity of 750 poises and a quenching index of 27.

An interpolymer prepared from like proportions of the monomeric ingredients had a quenching index of 30 to 31.

By withholding the hexamethylene diammonium sebacate salt solution until the end of the two-hour holding period at 250 pounds' pressure, then adding the salt solution and polymerizing as before, a semi-interpolymer with a quenching index of 29 was obtained.

By withholding the hexamethylene diammonium sebacate salt solution for four hours, during which the polyhexamethylene adipamide polymer was held at 250 pounds' pressure and 250° C., then adding the salt solution at the end of the four-hour holding period and polymerizing as before, a polymer with a quenching index of 31 was obtained.

Although the invention has been described above with reference to the use of an autoclave, it is to be understood that any other type of apparatus, in which synthetic linear polymers may be heated with water at an elevated pressure, will be suitable for use in accordance with the present invention.

The autoclave, or other type of heating apparatus may be heated in any desired manner, for example, by steam, by electrical heating elements, by Dowtherm (a mixture of diphenyl and diphenyl ether) or the like. The steam for heating the yarn in the autoclave may be generated in the autoclave or it may be passed thereto from any other source.

The ratio of waste yarn, or other source of polyamide to be depolymerized, to water which has been found to work best in the recovery of synthetic linear polyamides is 1:1. However, this ratio of waste yarn to water is not to be considered as limitative of the invention. It is only necessary that sufficient water be present to hydrolyze the amide linkages of the polyamide to produce molecules of sufficiently low molecular weight to form a liquid of the mass under the conditions of temperature and pressure existing in the autoclave. The presence of an excess quantity of water will not prevent the operation of the process since the excess water will be bled from the autoclave in the process of repolymerization.

In order to obtain a sufficient depolymerization of the polyamide, it has been found preferable in the case of polyhexamethylene adipamide that the water and synthetic linear polyamide in the autoclave be maintained at a temperature of between 200° C. and 210° C. for approximately one hour. This temperature range should not be considered as limitative of the present invention, however, for it is possible to degrade the polyamide at any higher temperature as high as 300° C. saturated steam, or higher, but at 300° C. the pressure (1200 pounds per square inch) is about as high as is convenient to use, or at a lower temperature depending on the particular polymer being recovered. Below about 160° C. the rate of depolymerization becomes inconveniently low. One skilled in the art can by experimentation find for each polyamide the lowest temperature at which depolymerization will occur and the optimum temperature at which to carry out the process. The time required for depolymerization at a given temperature, the cost of equipment, operating costs, etc., will enter into the determination of the optimum temperature.

As examples of simple polyamides which may be recovered according to the invention, the following may be named: polyhexamethylene adipamide, polyhexamethylene sebacamide, polydecamethylene adipamide, polydecamethylene sebacamide, polytetramethylene adipamide, polytetramethylene sebacamide, 6-aminocaproic acid polymer, 9-aminononanoic acid polymer, etc. Numerous diamines, such as hexamethylene diamine, decamethylene diamine, tetramethylene diamine, octamethylene diamine, etc., may be added during the recovery process. Various dibasic acids such as adipic acid, sebacic acid, etc., may be added. Numerous glycols, such as ethylene glycol, propylene glycol, pentaglycol, trimethylene glycol, hexamethylene glycol, decamethylene glycol, etc., may be added to produce polyester-polyamide products. Also, aromatic, hydroaromatic or aromatic aliphatic dihydric alcohols may be used for this purpose. The invention is also applicable to other synthetic linear polymers which are capable of being prepared by a condensation reaction with the resulting splitting out of molecules of water (or other small molecules) to form high molecular weight polymers.

It is to be understood that degrading liquids other than water, for example, alcohols, particularly monohydric alcohols such as methanol, ethanol, propanol, butanol, etc., may be used in the depolymerization of the synthetic linear polymers. Of course, the use of such other liquids would require the use of special repolymerization methods in case repolymerization were desired. Also, it is possible in certain cases to use a mixture of such degrading liquids.

By the term "degrading liquid," as used throughout the specification and claims, is meant a liquid which will itself dissociate and which will aid in the depolymerization of the synthetic linear polymer; i. e., the dissociation of the synthetic linear polymer solely along its polymer-forming linkages, the dissociated portions of said liquid reacting with the depolymerized units. For example, water will dissociate into H and OH radicals during the depolymerization, the latter radicals reacting with the depolymerized units present. In the case of polyethers, it is generally necessary to add a depolymerizing catalyst to the degrading liquid since polyethers are exceedingly stable even to high temperature and high pressure treatments. Examples of such catalysts for polyethers are aluminum chloride, hydriodic acid, hydrobromic acid, a mixture of acetyl chloride and zinc chloride, phosphorus pentachloride, phosphorus oxychloride, alcoholic potassium hydroxide, etc. With other synthetic linear polymers a catalyst is not necessary.

Interpolymers of various kinds may also be recovered in accordance with the principles of this invention. Interpolymers also may be made by recovering two different polymers at once. It is sometimes desirable to prepare a polyamide having a higher viscosity than that of the original waste polyamide. In the case of polymers stabilized with monobasic acids such as acetic acid or dibasic acids such as adipic acid, this may be done by adding a small amount of diamine to the autoclave at some time during the recovery cycle. By experimentation one skilled in the art can readily determine the quantity of diamine to add in order to produce a polyamide of the desired viscosity. Likewise, in the case of polymers stabilized with monobasic or dibasic amines, dibasic acids may be added to increase the viscosity. Other stabilizers, such as salts of diamines, for example, hexamethylene diammonum acetate (the salt of hexamethylene diamine and acetic acid), or monobasic acids or amines such as acetic acid or dodecyl amine, may be added to produce a polyamide of lower viscosity than that of the original waste polyamide.

Although the invention has been described particularly in terms of the process for recovering waste polyamides, it is to be understood it has much broader implications. In fact, the invention furnishes a new method for producing a wide variety of different polymers possessing great utility for various purposes. It has been previously mentioned herein that interpolymers may be made by recovering two different polymers at once. It has been found that these interpolymers will have different properties depending on the length of time and other conditions to which the polymers are exposed to depolymerizing conditions before proceeding with repolymerization. For example, if the two different polymers should be maintained under depolymerizing conditions sufficiently long to depolymerize to the monomeric ingredients or approximately to that state and then repolymerization is carried out, the resulting interpolymer is very similar in characteristics, such as quenching index and melting point, to the interpolymer obtained by polymerizing like proportions of the same kinds of monomeric materials which have not been previously polymerized. The preparation of this type of interpolymer is described in U. S. Patents Nos. 2,071,250, 2,071,251, 2,071,253, 2,130,523 and 2,224,037. The term "interpolymer" is herein restricted to those polymers obtained by the interpolymerization of monomeric ingredients. Such monomeric ingredients may not have been previously polymerized, although in some cases, the monomeric ingredients may have been obtained by complete depolymerization of one or more pre-formed polymers. Such depolymerization may be accomplished in various ways, for example, in accordance with the present invention or by hydrolysis in the presence of an acid or alkali or by any other convenient means. In general, it can be said that such interpolymers are made up of monomeric units distributed randomly throughout the length of the polymer chain. Reproducible interpolymers of the same properties and characteristics are readily made by starting with the same monomeric reactants and polymerizing under the same conditions.

Those polymers which are built up from relatively long units, such as may be obtained by a partial depolymerization of pre-formed simple polymers, are herein referred to by the term "semi-interpolymer." The term "simple polymer," as used herein, designates a polymer obtained by the polymerization of either (1) a single kind of bifunctional molecule, wherein the two functional groups are different, for example, an amino acid to produce a simple polyamide as in U. S. Patent No. 2,071,253 or a hydroxy acid to produce a simple polyester as in U. S. Patents Nos. 2,071,250 and 2,071,251; or (2) two different kinds of bifunctional molecules wherein one kind of molecule has both functional groups of the same type and the other kind of molecule has both functional groups the same as each other but complementary to the functional groups of the first kind of molecule, for example, a diamine-dibasic acid type polyamide, such as polyhexamethylene adipamide obtainable from hexamethylene diamine and adipic acid, as described in U. S. Patents Nos. 2,130,523, 2,130,948 and 2,190,770. In general, it can be said that semi-interpolymers possess higher melting points, lower quenching indices, greater stiffness, lower solubility and greater hardness than the interpolymers prepared from corresponding proportions of monomeric ingredients.

If a pre-formed polymer is depolymerized by hydrolysis, it breaks at various points along the chain. With such polymers as polyamides and polyesters an equilibrium is reached at which the degree of hydrolysis is determined by the temperature and the ratio of water to polymer. The more water added, the greater will be the degradation of the polymer. To prepare a semi-interpolymer having very long units, a small amount of water should be added to a simple polymer and depolymerization should be carried out for a short time; the resulting mixture should then be repolymerized along with other units which are to be a part of the ultimate semi-interpolymer as quickly as possible. To prepare a semi-interpolymer having comparatively short units, a comparatively large quantity of water should be added to a simple polymer and depolymerization for a comparatively long time should be carried out, followed by repolymerization in the presence of other polymer-forming units, and a long time may be taken for the repolymerization. In order to prepare semi-interpolymers with reproducible properties, it is an advantage to control the amount of degradation by the amount of water added and to choose the temperature and time of degradation so that the degradation reaction is at equilibrium prior to mixing with the other components of the semi-interpolymer and carrying out the repolymerization.

It is to be understood that the semi-interpolymers obtainable in accordance with the present invention may be produced by depolymerization of polymers other than synthetic linear polyamides followed by repolymerization in the presence of some different type of polymer-forming reactant. For example, semi-interpolyester-amides can be obtained by partially depolymerizing a simple polyester, such as polyhexamethylene adipate, then mixing the depolymerization products with hexamethylene diammonium adipate, followed by repolymerization. Similarly, a simple polyamide may be partially depolymerized and a simple polyester, partially depolymerized, the depolymerization products mixed, and the mixture repolymerized to produce a semi-interpolymer which I propose also to call a semi-interpolyester-amide. It is to be understood that this invention contemplates the preparation of semi-interpolymers from any polymers which can be depolymerized in accordance with this invention and repolymerized. The polyamides and polyesters of U. S. Patents Nos. 2,071,250 and 2,071,251, the amino-acid type polyamides of U. S. Patent No. 2,071,253, the diamine-dibasic acid type polyamides of U. S. Patents Nos. 2,130,523, 2,130,948, and 2,190,770 are particularly useful for preparing semi-interpolymers in accordance with the invention.

It is to be understood that the order in which depolymerization, mixing and repolymerization are carried out in the formation of semi-interpolymers may be varied considerably. The following are illustrations of ways in which these steps may be varied in the process of producing semi-interpolymers; and, in general, it will be found that different semi-interpolymers will be produced by varying these conditions:

1. One or more polymers may be mixed with water and depolymerized by heating to elevated temperatures (for example, 120° to 300° C.) and pressures for various lengths of time; then one or more monomeric reactants may be added and repolymerization carried out by removal of water at polymer-forming temperatures.

2. One or more polymers may be depolymerized in the autoclave; then one or more other depolymerized polymers may be added and repolymerization carried out after the mixing of the two or more separately depolymerized polymers.

3. One or more polymers may be depolymerized in the autoclave; then a different depolymerized polymer may be added and also a monomeric reactant added, followed by repolymerization subsequent to the mixing.

4. Two or more polymers may be mixed with water and heated to elevated temperature and pressure for various lengths of time, followed by repolymerization.

5. One or more polymers may be depolymerized in the autoclave in the presence of one or more monomeric reactants, followed by repolymerization in the autoclave.

6. One or more polymers may be depolymerized in the autoclave in the presence of one or more monomeric reactants; then one or more depolymerized polymers may be mixed with the autoclave contents and repolymerization carried out.

7. One or more polymers may be depolymerized in the autoclave in the presence of one or more monomeric reactants; then, one or more monomeric reactants may be added and repolymerization carried out.

8. One or more polymers may be depolymerized in the autoclave in the presence of one or more monomeric reactants; then, one or more depolymerized polymers may be added and followed by repolymerization.

It is to be understood that these variations in the steps of depolymerizing, mixing, and repolymerizing are merely illustrative and they are not to be considered as limiting the process of the present invention for producing semi-interpolymers. For example, by adding one or more half-made polymers to the depolymerized polymer in place of or in addition to a monomer or other depolymerized polymer, a large variety of conditions can be obtained for preparing different semi-interpolymers. Synthetic linear interpolymers, and synthetic linear semi-interpolymers can also be depolymerized in accordance with the present invention, and the resultant depolymerized material may be then polymerized to form many new and different polymers.

From the above discussion, it is seen that the present invention furnishes an excellent method for producing semi-interpolymers of innumerable different structural arrangements. It is to be understood that whenever a chain of greater length than that of a monomer (for example, of greater length than the salt formed from a diamine and a dibasic acid, or an amino acid or some other monomeric polymer-forming material), is reacted with some different polymer-forming reactant (either a monomer or a half-made polymer or a partially depolymerized polymer) which is derived from different original monomeric materials, a semi-interpolymer will be produced. In the case of polyamides, half-made polymers are, in general, non-fiber-forming and have intrinsic viscosities below 0.4, intrinsic viscosity being defined as in U. S. Patent No. 2,163,636.

It is also possible to produce semi-interpolymers by the process of controlled heating of a plurality of pre-formed polymers in an anhydrous molten state. That process is particularly advantageous in the preparation of semi-interpolyamides since, in the controlled heating of two or more pre-formed polyamides, there is opportunity for amide-interchange to occur. Thus, new polymers made up of long units can be obtained. Such processes are more particularly described in copending applications. The process of the present invention for preparing semi-interpolymers is more advantageous, however, since it is more readily controlled. The lengths of the units going to make up the semi-interpolymer are more readily predetermined. The conditions for preparing the semi-interpolymers are more variable, thus making possible a wider variety of semi-interpolymers. The water, or other degrading liquid, acts as a good heat transfer medium and a solvent at elevated temperatures and pressures, thus facilitating the preparation of homogeneous semi-interpolymers.

In Example I a process for cleansing waste yarn was described. It is to be understood that various steps may be necessary in preparing the waste yarn before charging the same into the autoclave depending on the source of the yarn. Soap solutions of various kinds and concentrations may be used for this purpose. Other detergents and cleansing agents may be required. Solvents may be necessary to remove oils, finishes, or other contaminating agents which would not react properly in the autoclave treatment. It is sometimes found that foreign particles such as ring travelers become mixed with the waste yarn. Such objects are usually removed by straining the same through the screen 16 at the bottom of the autoclave.

While the invention has been described particularly with respect to the recovery of waste yarn resulting from occurrences in the manufacture which cause the yarn to be inferior, it should be clearly understood that the invention is not to be limited to the recovery of such yarns. It is possible in accordance with the principle of this invention, to recover polyamide from fabrics of various kinds. For example, stockings prepared from polyhexamethylene adipamide may be subjected to various treatments for removal of substances other than the polyamide, then degraded and re-made into polymer, spun into yarn, and knitted into new stockings. Polyamide may be recovered from mixed fabrics or mixed yarns or fibers such as a mixture of cotton and polyhexamethylene adipamide yarns or fibers. The polyamide may be degraded and the fluid mass containing the depolymerized polyamide filtered from the cotton. Also, polyamides may be recovered from scrap produced in molding and turning operations. It is to be understood that this invention encompasses the recovery of polyamides from any sources of the polyamides by depolymerization, under heat and pressure and in the presence of a degrading liquid, to a fluid state, followed, if so desired, by repolymerization to a high molecular weight polymer.

While the invention has been described particularly with regard to recovery of polyamides involving degradation, and in some cases repolymerization, it is to be understood that the process of partial hydrolysis or degradation under pressure in the presence of a degrading liquid may be applied to many types of polyamide articles with the resultant production of utility due to the altered affinity of the depolymerized (or partially hydrolyzed) part of the article for dyes, finishes, sizes, surface-active agents, or other treating agents containing functional basic or acid groups. For example, a certain part of a fabric may be induced to absorb more dye by subjecting that portion of the fabric to a partial hydrolysis under pressure. Other degrading liquids than water may also be used in this type of treatment, for example, alcohols such as methanol, ethanol, etc.

The polymer recovered in accordance with this invention and the semi-interpolymers prepared in accordance with this invention may be used as such or in conjunction with modifying agents, such as luster-modifying agents, plasticizers, pigments and dyes, cellulose derivatives, antioxidants, resins, oils, other polymers, etc. Such modifying agents may in certain cases also be added to the autoclave during the recovery process. It is preferred to add the delustering agent, such as titanium dioxide, or other pigments, as a slurry in water to the autoclave at the beginning of the polymerization cycle when all of the polymer-forming materials are present in the autoclave. However, the delustering agent may be incorporated in the polymer at various other points during the preparation of the polymer or the subsequent shaping of it.

Polymers recovered in accordance with this invention may be blended in any proportions with new polymer (that is, polymer prepared from new ingredients, such as a newly prepared polyamide prepared from a fresh batch of a diamine and a fresh batch of a dibasic acid) or likewise in any proportions with other recovered polymers.

This invention makes possible great savings in the manufacture of shaped articles from synthetic linear polymers. Some of the yarn produced in the conventional manufacturing process is inferior because of broken filaments, uneven denier, and other undesirable characteristics. Without this recovery process, this yarn would have to be discarded or sold at exceedingly low prices. In accordance with this invention, it can now be recovered and formed anew into good yarn or other shaped articles such as bristles, fishing lines and leaders, tennis strings, and numerous other useful products. The yarn obtained from the recovered polymer has as good tenacity as does yarn prepared from new polymer.

Moreover, yarn spun from recovered polymer frequently has a much smaller proportion of flecks than yarn spun from the original polymer. A fleck is a type of defect in a filament occurring during spinning in which for a short length (about 1-2 millimeters) the diameter is abnormally high. Synthetic linear polyamide yarns are cold drawn to orient the molecules along the fiber axis. A fleck is more resistant to cold drawing than the adjacent parts of the filament and frequently causes the filament to break at a point immediately adjacent to the fleck during cold drawing. However, yarns having a high proportion of defects due to flecks and a consequent high proportion of broken filaments can be put through the recovery process of this invention with the subsequent production of yarns from the recovered polymer which have a greatly reduced proportion of defects due to flecks. The table illustrates the marked improvement produced in several polyamide yarns recovered using water as the depolymerizing agent.

TABLE

*Average of defects per 1,000 yards of yarn*

| | Polymer | Before recovery | After recovery |
|---|---|---|---|
| 1 | Polyhexamethylene adipamide | 11.2 | 1.0 |
| 2 | ____do____ | 11.8 | 1.1 |
| 3 | ____do____ | 14.0 | 1.1 |
| 4 | ____do____ | 13.8 | 1.1 |

This is a very great advantage; for it has not been heretofore possible to reduce the number of flecks produced by a given polymer. It is very surprising that a process for recovering a waste material results in a product which is superior to the original.

Another great advantage to the process of this invention is the opening up of the great possibilities of recovering the polymer from used articles. The yarn in stockings, for instance, is by no means deteriorated to the point of being useless when the stocking has become unusable as such, for the polymer may be recovered in accordance with the principle of this invention and made into high grade stockings again. These considerations are especially important in view of the high original cost of the ingredients used in preparing the synthetic linear polyamides.

As it is evident that many changes and modifications can be made in the above-described details of this invention without departing from the nature and spirit of the invention, it is to be understood that the invention is not to be limited to these details except as set forth in the appended claims.

I claim:

1. The process which comprises depolymerizing into polymer-forming units, by heating under pressure in the presence of water, a solid synthetic linear polymer taken from the class consisting of synthetic linear polyamides and synthetic linear polyesters, and polymerizing, by removal of water at a polymer-forming temperature, said polymer-forming units together with different polymer-forming units taken from the class consisting of synthetic linear polyamide-forming units and synthetic linear polyester-forming units.

2. The process which comprises depolymerizing into polymer-forming units, by heating under pressure in the presence of water, a solid synthetic linear polymer taken from the class consisting of synthetic linear polyamides and synthetic linear polyesters, adding to said polymer-forming units other different polymer-forming units taken from the class consisting of synthetic linear polyamide-forming units and synthetic linear polyester-forming units, polymerizing the mass of polymer-forming units.

3. The process which comprises depolymerizing into polymer-forming units, by heating under pressure in the presence of water, at least two different solid synthetic linear polymers taken from the class consisting of synthetic linear polyamides and synthetic linear polyesters, and polymerizing, by removal of water at a polymer-forming temperature, said polymer-forming units.

4. The process which comprises depolymerizing into polyamide-forming units, by heating under pressure in the presence of water, a solid synthetic linear polyamide, and polymerizing, by removal of water at a polyamide-forming temperature, said polyamide-forming units together with different polyamide-forming units.

5. The process which comprises depolymerizing into polyamide-forming units, by heating under pressure in the presence of water, a solid synthetic linear polyamide, and polymerizing, by removal of water at a polymer-forming temperature, said polyamide-forming units together with synthetic linear polyester-forming units.

WESLEY RASMUS PETERSON.